United States Patent [19]

Kammiller

[11] Patent Number: 5,563,775
[45] Date of Patent: Oct. 8, 1996

[54] FULL BRIDGE PHASE DISPLACED RESONANT TRANSITION CIRCUIT FOR OBTAINING CONSTANT RESONANT TRANSITION CURRENT FROM 0° PHASE ANGLE TO 180° PHASE ANGLE

[75] Inventor: Neil A. Kammiller, Lorain, Ohio

[73] Assignee: Reliance Comm/Tech Corporation, Lorain, Ohio

[21] Appl. No.: 260,524

[22] Filed: Jun. 16, 1994

[51] Int. Cl.$^6$ .................................................. H02M 2/335
[52] U.S. Cl. .................. 363/17; 363/56; 363/98; 363/132
[58] Field of Search .............................. 363/15–26, 95–98, 363/131–134; 315/219, DIG. 4, DIG. 7, 227 R, 209 R, 200 R, 205, 207, 219, 224; 323/266

[56] References Cited

U.S. PATENT DOCUMENTS

| | | | |
|---|---|---|---|
| 3,691,450 | 9/1972 | Cox | 321/45 R |
| 4,533,836 | 8/1985 | Carpenter et al. | 307/11 |
| 4,541,041 | 9/1985 | Park et al. | 363/98 |
| 4,672,528 | 6/1987 | Park et al. | 363/98 |
| 4,788,634 | 11/1988 | Schiecht et al. | 363/21 |
| 4,855,888 | 8/1989 | Henze et al. | 363/17 |
| 4,860,184 | 8/1989 | Tabisz et al. | 363/17 |
| 4,864,479 | 9/1989 | Steigerwald et al. | 363/17 |
| 4,953,068 | 8/1990 | Henze | 363/17 |
| 4,954,754 | 9/1990 | Nolssen | 315/219 |
| 5,113,334 | 5/1992 | Tuson et al. | 363/25 |
| 5,132,889 | 7/1992 | Hitchcock et al. | 363/17 |
| 5,157,593 | 10/1992 | Jain | 363/17 |

OTHER PUBLICATIONS

"High Performance 600 Watt Power Supply Features Phase Shifted Resonant PWM Control Technique", Bill Andreycak, HFPC–May 1992.

*Primary Examiner*—Peter S. Wong
*Assistant Examiner*—Aditya Krishnan
*Attorney, Agent, or Firm*—Fay, Sharpe, Beall, Fagan, Minnich & McKee

[57] ABSTRACT

In a full-bridge phase displaced resonant transition circuit a center-tap is placed on the power transformer primary winding. The center-tap is connected to an inductor at one end with another end of the inductor connected to a large capacitor. The other end of the capacitor is connected to circuit common. During the time that a diagonal of the switching bridge is conducting, current will increase in the inductance of the power transformer primary winding. When the bridge changes to a horizontal conduction situation, the current in the power transformer primary winding will stop increasing and will essentially hold its value until the next diagonal conduction. Concurrently during the horizontal conduction the current in a resonant inductor will increase. When the bridge changes again to diagonal conduction the resonant inductor will stop increasing and essentially hold its value until the next horizontal conduction. Through this operation, at any given time there is current in one or the other inductances which is increasing and thus storing energy to be used for resonant transition even at zero phase no-load conditions.

19 Claims, 5 Drawing Sheets

FULL BRIDGE PHASE DISPLACED RESONANT TRANSITION CIRCUIT FOR OBTAINING CONSTANT RESONANT TRANSITION CURRENT FROM 0° PHASE ANGLE TO 180° PHASE ANGLE

BACKGROUND OF THE INVENTION

The present invention relates to a phase displaced resonant transition circuit which implements zero-voltage switching, and more particularly to a circuit maintaining constant resonant transition current from 0° phase angle to 180° phase angle in a full bridge configration.

As electronic equipment is continuously being miniaturized the power supplies used by such equipment must necessarily also be reduced in size. In order to accomplish the size reduction, designers are developing systems with increased switching frequencies allowing the use of smaller sized components. Also being used are newly developed topologies, such as resonant-mode supplies employing zero-voltage switching which are useful in decreasing power losses and radio frequency noise that normally occur at higher frequency switching. This zero-voltage switching is accomplished when a switch begins conduction near zero-voltage across the switch.

As switching frequencies are climbing to one MHz and beyond, the power supplies being used must produce an increasing amount of power while taking up less space, causing the power density to increase dramatically. In this environment there is, therefore, a crucial need to improve the efficiency of the power supplies.

At the component level, the technologies are already in place to take switching frequencies into the MHz region. Power FETs are the preferred switching device over bipolar transistors. FETs simplify dealing with magnetic saturation as they do not store charge, which results in a decrease in their switching transition time by more than an order of magnitude over bipolar transistors. Additionally, destructive secondary breakdown is avoided, which is inherent in bipolar transistors and, therefore, reduces or even eliminates the need for speed limiting snubber circuitry.

Many resonant zero-voltage switching circuitry topologies have been described including those discussed in Steigerwald, et al. U.S. Pat. No. 4,864,479; Jain U.S. Pat. No. 5,157,593; Walters U.S. Pat. No. 5,157,592; and the article entitled "High Performance 600 Watt Power Supply Features Phase Shifted Resonant PWM Control Technique" by Bill Andreycak and references cited within these patents and article.

It is noted that at the moment of turn-off of each switch of a resonant transition circuit, there needs to be present in that switch a lagging current of sufficient amplitude and duration to cause the voltage on that switch to rise to the amplitude of the supply in a totally passive fashion. At heavier loads, this current will be present in the series inductance of the power transformer. At light loads, the current may be obtained from energy stored in the shunt inductance of the power transformer. However, as a load approaches no-load and the phase angle approaches 0°, the volt-seconds applied to the power transformer primary approaches zero, and thereby the energy stored in the power transformer primary which is available as lagging current for resonant transition also approaches zero causing resonant transition to fail.

FIG. 1 shows a phase shifted full bridge converter with FET switches Q1, Q2, Q3 and Q4 operating at a fixed frequency. In order to lower the power dissipation in this circuit zero-voltage techniques are implemented, where a switch begins conduction with a near zero-voltage existing across the switch. To accomplish zero-voltage switching over a large range of line voltages and loads, the inductive currents carried by the switching devices are increased which in turn increases the conduction losses of the power devices and, therefore, provides very little gain in overall efficiency.

The on time of the diagonally conducting switches in FIG. 1 is not varied as in a PWM bridge circuit, rather the switches in a first leg (Q1 and Q2) and a second leg (Q3 and Q4), are made to conduct at a duty cycle approaching 50%. The phase shift between the operation of the switches in each of the legs determines when the diagonal switches Q2 and Q3 or Q1 and Q4 are conducting at the same time and, therefore, supplying power to a load. By varying the phase shift, the resulting output voltage can be pulse width modulated.

The transformer primary current flowing at turn-off of one transistor charges the parasitic capacitances of that transistor while reducing the charge on the parasitic capacitances of the other transistor in the same leg, thereby reducing the voltage across the other transistor, which is also the next transistor to be turned on. To obtain zero-voltage switching requires that the turn-on of the transistor in the same leg with the transistor that was just turned off must be delayed until the voltage across the transistor to be turned on has been reduced to near zero. For a pair of transistors in the same leg, the time required to charge the capacitances of the transistor being turned off and discharge the parasitic capacitance of the transistor to be turned on, is inversely proportional to the magnitude of current established before the switching interval.

Transistors Q1 and Q2 are turned on after a freewheeling period when current was being circulated in the bridge and the current established before switching is the current circulating in the transformer primary $T_P$ during the freewheeling interval. The freewheeling interval is the portion of each cycle when no energy is being supplied to the output load L connected with filter capacitor $C_f$ and choke coil $C_c$, from the input power source Vin. The transformer leakage inductance is the energy source displacing charge on the parasitic capacitances of transistors Q1 and Q2, where the magnitude of energy is proportional to the square of the circulating current.

The circulating current will decay during the freewheeling interval, as a result of both output rectifiers $R_1$, $R_2$, which are connected to the two ends of the transformer secondary $T_s$, conducting current and reducing the energy stored in the leakage inductance, and as a result of Q1–Q4 $R_{ds}$ (i.e. drain to source losses on losses as well as intrinsic diode losses in Q1–Q4. The circulating current is equal to the difference in output rectifier currents divided by the turns ratio of the transformer. With both output rectifiers carrying equal current, the transformer primary current would be zero, resulting in no energy available in the transformer leakage inductance to charge the parasitic capacitances of the transistor to be turned on, and for this condition, zero-voltage switching would not be achieved. The magnitude of the circulating current is always less than the reflected output inductor current when power is being delivered to the load. Therefore, zero-voltage switching is more difficult to achieve with transistors Q1 and Q2, which are turned on after circulating current was flowing in the bridge.

One approach to maintain zero-voltage switching is to increase the magnitude of the leakage inductance. This will reduce the magnitude of the current decay during the freewheeling interval. Additional leakage inductance will also increase the energy available for displacing charge on the transistor's output capacitances. With this approach, a minimum leakage inductance can be specified to meet zero-voltage switching requirements for a specific line and load condition. However, the high leakage inductance will reduce the effective duty cycle ratio to the transformer secondary due to the increased recovery time of the output diodes. This will limit the input voltage range of the converter and adversely affect the voltage control characteristics.

Another approach for achieving zero-voltage switching over a wide input line and output load range uses saturable reactors with specific blocking characteristics. A saturable reactor is used in series with each push-pull output rectifier. This technique uses a round or flat B-H loop reactor core material to induce a significant flux excursion during the output rectifier commutating interval. The reactor will provide a blocking characteristic proportional to the flux excursion. The blocking characteristic of the reactor together with a clamped primary prevents the conduction of both rectifiers during the freewheeling interval. This forces the circulating inductor to follow the output inductor current. Therefore, more energy is available to displace the transistor's parasitic capacitance charge. However, for a converter to achieve zero-voltage switching at a light load, the saturable core must be designed to block the entire freewheeling interval. At full load, more than the required energy for zero-voltage switching is available, and as a consequence, transistor conduction losses are increased.

None of the above cited material describe a method and/or circuit where a constant resonant transition current is obtained from 0° phase angle to 180° in no-load to full-load situations for a full bridge phase displaced resonant transition circuit and which also limits the core losses of a power transformer to substantially a single core loss.

The present invention provides a new and improved full bridge phase displaced resonant transition circuit and method which overcomes the above referenced drawbacks and others.

SUMMARY OF THE INVENTION

In accordance with one aspect of the present invention, a full bridge phase displaced, resonant transition circuit which obtains constant resonant transition current from 0° phase angle to a 180° phase angle is provided. The bridge circuit has first and second switches connected in series forming a first leg, and a third and fourth switches connected in series forming a second leg. The legs are connected in parallel with one another and in parallel with a power supply. A first end of a primary winding is connected to a junction of the first and second switches and a second end of the primary winding is connected between a junction of the third and fourth switches. A secondary winding is inductively coupled to the primary winding and to a rectifying circuit supplying a controllable voltage to a load. A center tap leg which includes an inductive element and a capacitive element is provided. The inductive element is connected at a first end in a center tap arrangement to the primary winding. A second end of the inductive element is connected to a first end of the capacitive element and a second end of the capacitive element is connected to circuit common.

In accordance with another aspect of the present invention, a method of resonant transition switching is provided. The method maintains a constant resonant transition current from 0° phase angle to a 180° phase angle in a full bridge phase displaced resonant transition circuit. A center-tap is inserted into the primary winding of the full bridge phase displaced circuit with a first end of the inductor connected to the center-tap primary and a second end of the inductor connected to a first end of a capacitor. The second end of the capacitor is then connected to a circuit common or ground. When operating the full bridge at a 100% duty cycle, all transformer core losses are at the primary winding. When the full bridge is operated at 0% duty cycle and maximum voltage is on the inductor and substantially zero-voltage is on the primary, all transformer core losses are located at the inductor.

In accordance with yet another aspect of the present invention, the full bridge switching circuit is switched to a first diagonal conducting state where current increases in the primary winding of the full bridge. The circuit is then switched to a first horizontal conducting state where the current at the primary winding ceases to increase and holds it value, and concurrently current in an inductor in an inductance capacitance arrangement increases. The circuit is then switched to a second diagonal conducting state wherein the current in the inductor holds it value until a next horizontal conducting state. The switching steps are repeated such that at any given time there is current in the primary inductor which is increasing and thereby storing energy to be used for resonant transition and there is current in the primary winding which is also used for resonant transition.

BRIEF DESCRIPTION OF THE DRAWINGS

The present invention may take form in various parts and arrangements of parts or in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
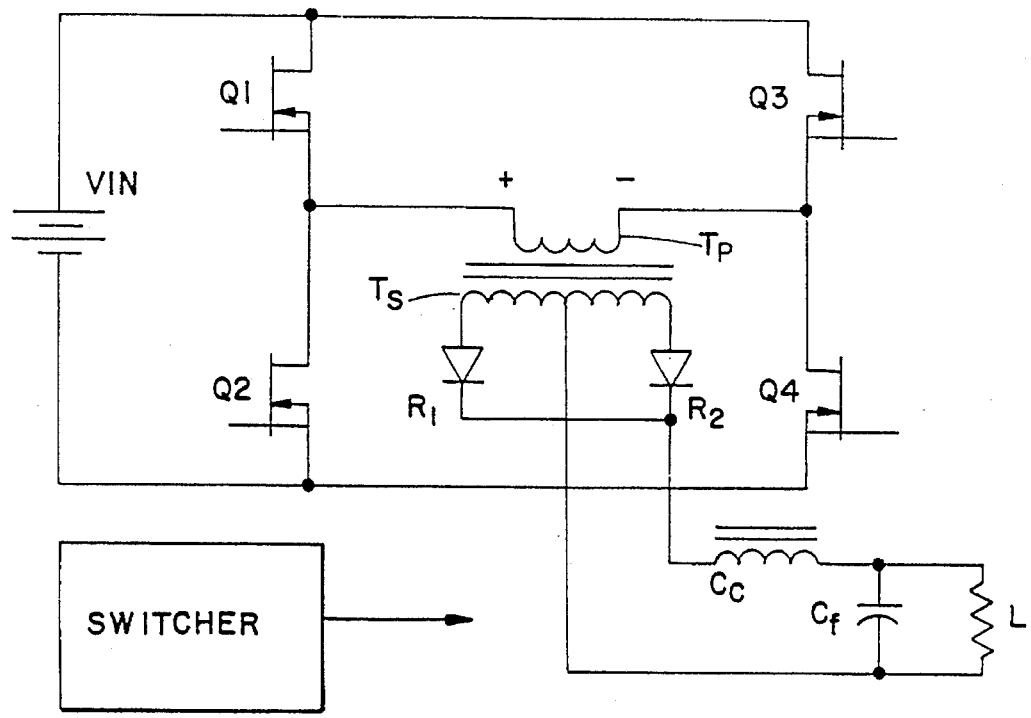
FIG. 1 is a diagrammatic illustration of a prior art resonant converter.
Figure 2:
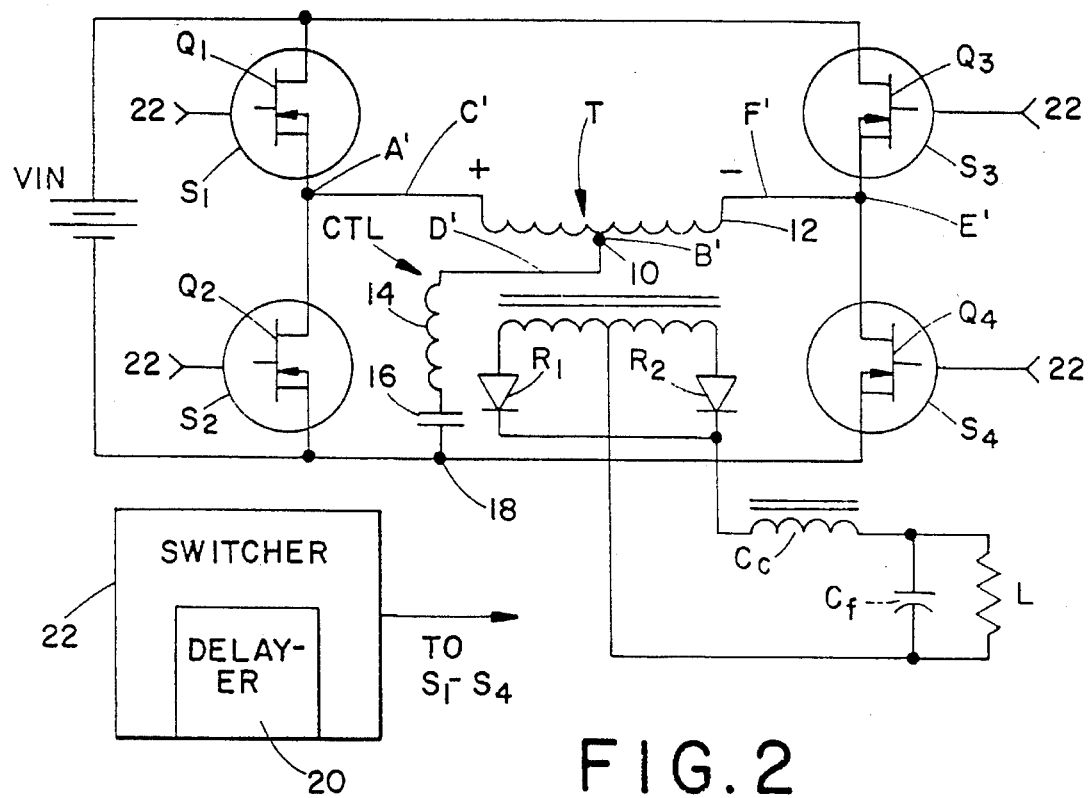
FIG. 2 is a diagrammatic illustration of a resonant converter according to an embodiment of the present invention.

FIG. 2 sets forth a circuit of the present invention which overcomes failed resonant transition switching when the load approaches no-load and the phase angle approaches 0°. This circuit is a constant frequency full resonant mode converter. In this embodiment, switches S1–S4 include switching elements such as FET transistors Q1–Q4. As will be known by one skilled in the art each of the FETs include an intrinsic body diode and parasitic junction capacitance. Switches S1–S4 are arranged in a bridge network with a power transformer T and output circuitry similar to that shown in FIG. 1. However, this circuit further includes a center-tap leg CTL. The leg includes a center-tap 10 on the power transformer primary winding 12 which has a fixed appropriate inductance. The center-tap 10 is connected to one end of a resonant inductor 14. The other end of resonant inductor 14 is in turn connected to one end of a capacitor 16 whose other end is connected to circuit common or ground 18. The capacitor will be of a size such that it will hold at least ½ DC voltage of the circuit at zero volts AC.

The addition of the above noted elements allow the present circuit to operate in no-load situations as well as less severe conditions. The following description is presented at no-load for purposes of detailing the beneficial aspects of the present invention.

During the time that a diagonal of the switches S1–S4 are conducting (i.e. S1 and S4 or S2 and S3), current will increase in the shunt inductance of the power transformer primary winding 12. When the bridge changes to horizontal conduction (i.e. S1 and S3 or S2 and S4), the current in the power transformer primary winding 12 will stop increasing and will essentially hold its value until the next diagonal conduction. Concurrently, upon this switching, during horizontal conduction, the current in the resonant inductor 14 will increase. When the bridge S1–S4 changes again to diagonal conduction, the current in the resonant inductor 14 will stop increasing and will essentially hold its value until the next horizontal conduction. Thus, at any given time there is a current in either the resonant inductor 14 or the shunt inductance of the power transformer primary winding 12, which is increasing with respect to its switch and thus storing energy to be used for resonant transition. Furthermore, since the peak currents in each of the resonant inductor 14 and transformer primary winding 12 are directly proportional to the time during which voltage is applied and since the sum of the times is constant, the sum of the two currents is constant.

Each current waveform is a trapezoid, and these trapezoids will be out of phase with each other. The trapezoidal waves are additive in the power transformer 7, and because the end of one trapezoidal wave coincides with the beginning of another trapezoidal wave the sum is a triangle wave, providing the inductances are in an appropriate ratio. The peak of the triangle wave occurs at the turn-off of each of the switches S1–S4 and is constant regardless of phase angle which is controlled by delay means 20 which is part of a switching means 22. The switching means and delay means being configured in known arragements including but not limited to the use of flip-flops, counters, timers and clocks.

The current component present in the resonant inductor 14 is reduced by a factor of two (2) due to autotransformer action of the power transformer T. Since the voltage impressed on the resonant inductor 14 is one half that impressed on the primary by the switches and since the current in the resonant inductor 14 is reduced by a factor of two (2) by autotransformer action, the correct size of the resonant inductor 14 is approximately ¼ the inductance of the shunt inductance of power transformer primary winding 12. It is to be appreciated that by changing the ratio of current in the resonant inductor 14 and the current in the power transformer primary winding 12 varying outputs can be achieved.

Core losses in the power transformer and in the inductor 14 are complimentary, that is when one is up the other is down. The losses are related to the volt-seconds applied, and the relationship is similar to that of the peak currents versus conduction angle. Therefore, the sum of the core losses of the resonant inductor 14 and that of the shunt inductance of the power transformer winding 12 will equal (1) one core loss.

FIGS. 3A–3H show waveforms output by a circuit constructed according to the present embodiment tested at 370 volts input. In FIGS. 3A–3D waveform A was taken at point A' which is the left Vac bridge. Waveform B is the center-tap voltage taken at point B' of the circuit; waveform C is the current taken through the left leg of the bridge at point C'; and waveform D is the center tap current taken at location D' of the circuit. In the FIGURES each division represents 5 amps per division and 200 volts per division.

Figure 3A:
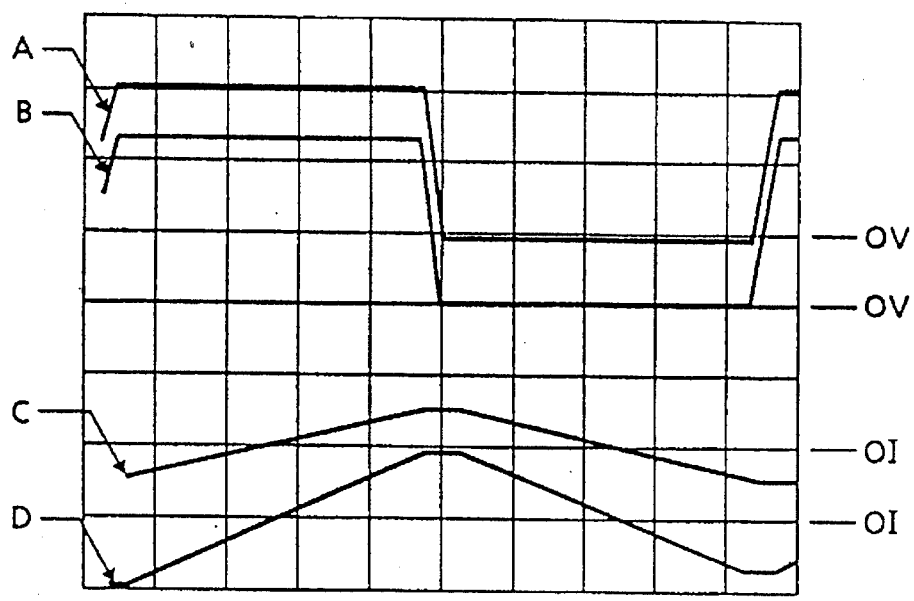
FIGS. 3A–3H are waveforms produced from the circuit of the present invention.
Figure 3B:
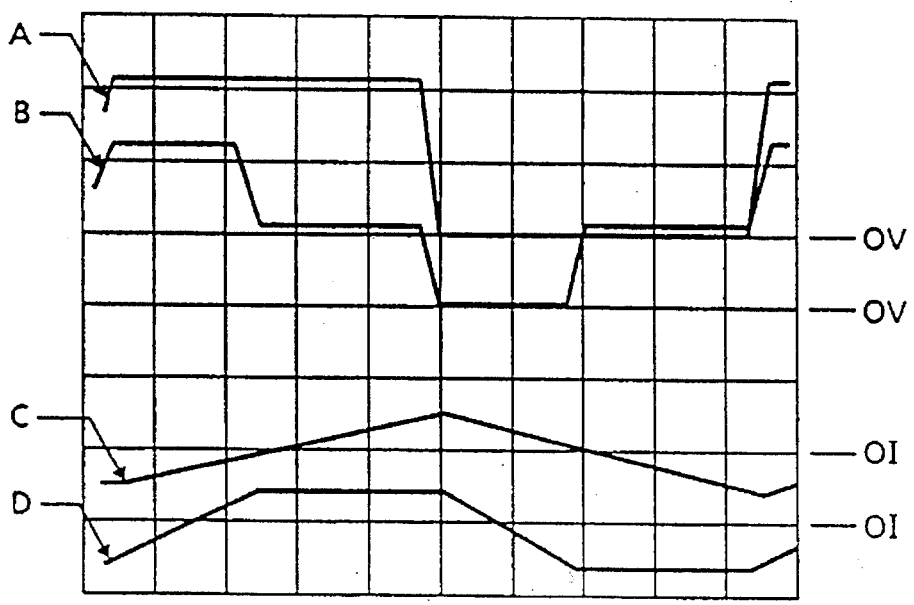
Figure 3C:
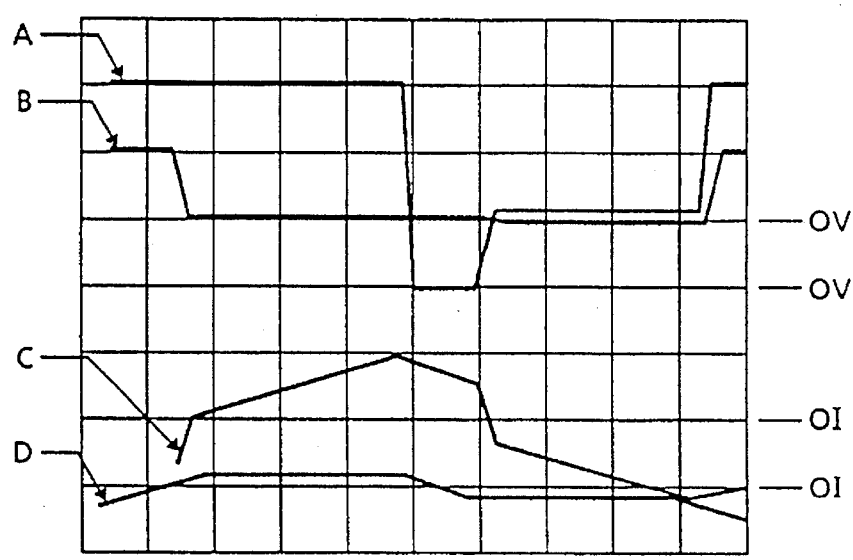
Figure 3D:
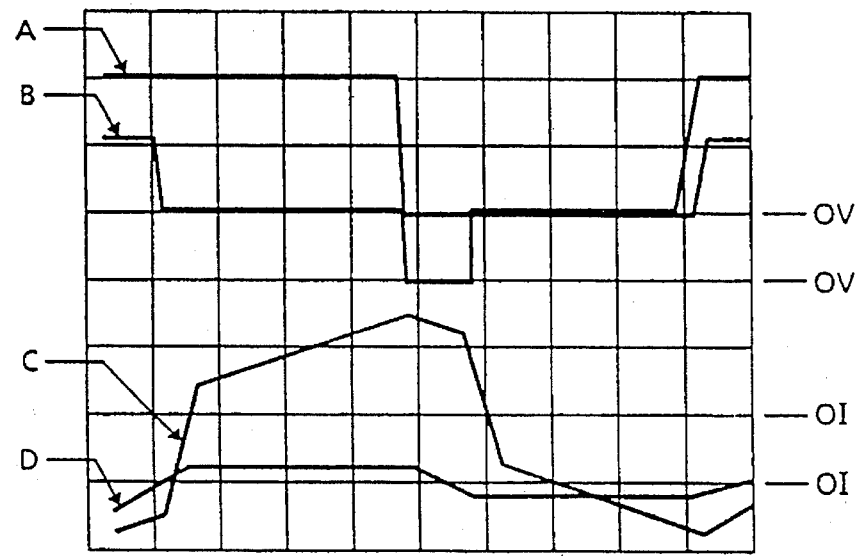

FIG. 3A shows a condition of no-load and 0° phase angle. FIG. 3B is a situation of 50 volts output with no-load. FIG. 3C reflects 50 volts output and 12.5 amps output which is approximately half load. FIG. 3D provides waveforms at 50 volts output and 25 amps output which is approximately a full-load situation.

Viewing these waveforms in sequence provides an understanding of the operation of the present circuit. In FIG. 3A which is an extreme no-load 0° phase angle condition, there is no diagonal switching occurring where a small pre-load current is provided. Switches are operating only in a horizontal manner. Particularly, switches S2 and S4 are switching together and switches S1 and S3 are switching together. However, there is no occurrence where, for example, switch S1 and switch S4 are on at the same time to provide an output voltage. In such a situation, the current through resonant inductor 14 is at its maximum. This can be seen in FIG. 3A where the current in the left leg at point A' of the bridge is at its minimum. Therefore, energy is being accumulated in the resonant inductor 14 at this time. However, as shown in FIG. 3B, as the phase angle between the switching elements is increased, the current through of the center-tap 10 decreases and the current through the left leg at point A' of the circuit increases. This indicates the contribution from the primary transformer winding 12 is increasing. In FIG. 3C the current through the center-tap 10 decreases even more and the current through the left leg C' of the circuit increases even more. Finally, as shown in FIG. 3D, as the phase angle approaches 180° and the device approaches full-load output, there is near zero contribution to resonant transition switching from the resonant inductor 14 and nearly all contribution to energy storage is from the inductance of the primary winding 12 of the transformer.

The description of these waveforms point out the dovetailing effect of the inductance in the primary transformer winding 12 and the resonant inductor 14. It is to be appreciated that the current detected at point C' in FIG. 3A is due to transformer action and the transformer action is at a 2–1 ratio due to the use of center-tap 10.

FIGS. 3E–3H also emphasize the contributory nature of each of the inductances of the power transformer winding 12 and the resonant inductor 14. In these FIGURES waveforms B and D have been replaced with E and F. Waveform E is taken at location E' which is the right side of the bridge. Waveform F is the current taken from point F' of the circuit and is the current in the right side of the bridge.

Figure 3E:
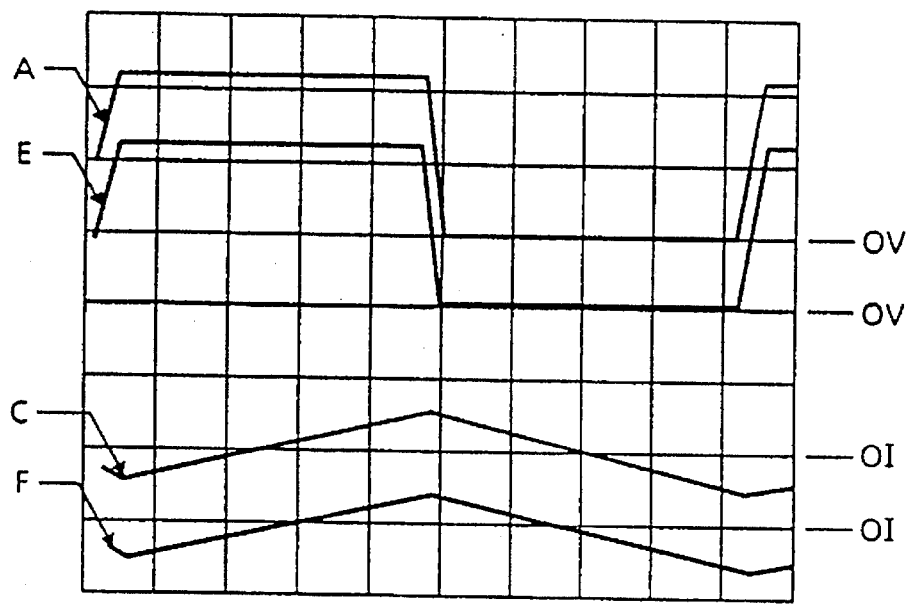
Figure 3F:
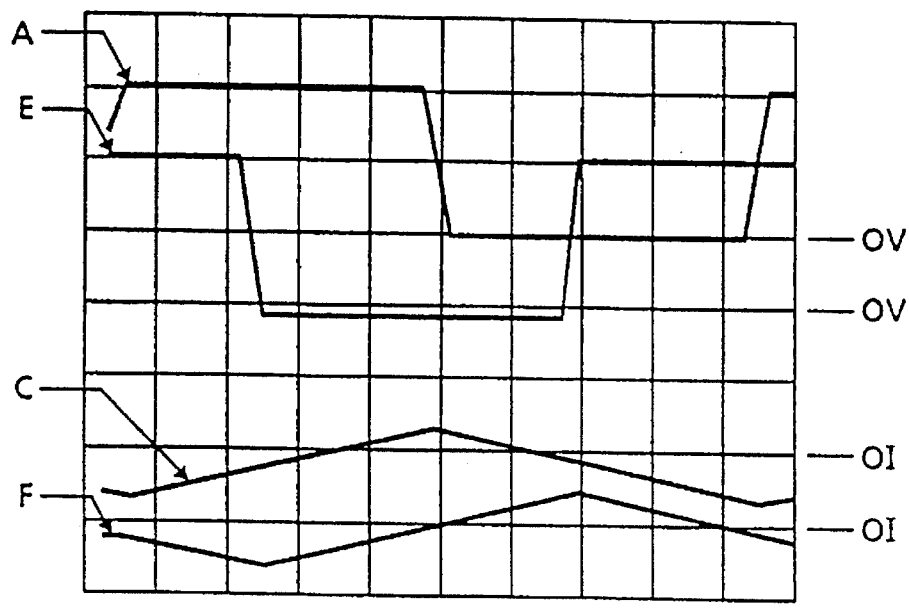
Figure 3G:
Figure 3H:

As detailed in FIG. 3E practically all contribution to the storage of energy for resonant transition is provided by the resonant inductor 14 with substantially no support from the inductance of the power transformer primary winding 12. Similar to FIG. 3A, this is a situation with 0° phase angle and zero volts output. However, as the delay means 20 causes a delay phase to occur between the switches the contribution from the inductance of the power transformer primary winding 12 increases. This is shown by the shifting between waveforms A and F and current waveforms C and E. As the inductance of the primary transformer provides a greater contribution, as depicted in FIG. 3H, the waveforms appear to be more in-phase, showing that the contribution is almost entirely from the inductance of the primary transformer winding 12. Therefore, in a substantially full-load situation as shown in FIG. 3H the two outer legs become in-phase as the resonant inductor 14 component contributes less to transition. The sequence of FIGS. 3E–3H again emphasize the dove-tailing nature of the inductance from the primary transformer winding 12 and the resonant inductor 14. Through such a situation when a no-load, 0° phase angle situation occurs, there is sufficient energy stored in the resonant inductor 14 capacitor 16 arrangement to provide the necessary charge to complete resonant switching.

In an alternative to the above circuit, the failure of resonant transition switching at no-load, 0° phase angle situations can be overcome by adding two resonant inductors, one at each AC terminal of the FET bridge with the remaining terminals joined and connected to a large capacitor. The other end of the capacitor may then be connected to circuit common. The inductors will be energized with full voltage under all conditions. However, in such an embodiment they will exhibit constant losses in addition to power transformer core losses.

Another manner to obtain no-load switching would be to employ two half bridge circuits each with its own primary winding with the secondaries combined either magnetically in one structure or electrically in two separate structures. In such a situation double core losses would still exist.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A phase displaced, resonant transition circuit maintaining constant resonant transition current from 0° phase angle to 180° phase angle, the circuit comprising:
   a full bridge circuit having a first and second switch connected in series forming a first leg, and a third and fourth switch connected in series forming a second leg, said first and second legs connected in parallel with one another and in parallel with a power supply;
   a primary winding, a first end of the primary winding connected to a junction of the first and second switches and a second end of the primary winding connected to a junction of the third and fourth switches;
   a secondary winding inductively coupled to the primary winding, the secondary winding connected to a rectifying circuit supplying a controllable voltage to a load; and
   a center tap leg including a resonant inductance and a capacitance, the inductance means connected at a first end in a center-tap arrangement to the primary winding, a second end of the resonant inductance connected to a first end of the capacitance, and a second end of the capacitance connected to circuit common.

2. The circuit according to claim 1 further including a switcher configured and connected to switch each of the switches on and off at a constant frequency wherein when switches one and four or two and three, located in the bridge diagonally to each other are switched on at the same time, power is transferred to the secondary winding.

3. The circuit according to claim 1 further including a delay device configured and constructed to introduce a delay between switching of switches located diagonally to each other, wherein introduction of a delay results in a phase shift between drive signals.

4. The circuit according to claim 1 wherein the primary winding has a fixed predetermined inductance.

5. The circuit according to claim 1 wherein the capacitance is of a large fixed value which holds at least ½ DC supply.

6. The circuit according to claim 1 wherein an inductance value of the primary winding and an inductance value of the inductance are selected to be in a predetermined ratio to each other whereby each leg of the circuit maintains a triangle wave of exciting current regardless of the phase angle.

7. The circuit according to claim 6 wherein the amplitude of the triangle wave is constant regardless of conduction angle.

8. The circuit according to claim 1 wherein current in the primary winding increases during diagonal conduction and maintains its level during horizontal conduction.

9. The circuit according to claim 1 wherein current in the inductance means increases during a horizontal conduction and maintains its level during horizontal conduction.

10. The circuit according to claim 1 wherein summation of the current in the primary winding and current in the inductance form a triangle waveform.

11. The circuit according to claim 1 wherein when the capacitance is at AC zero volts it is at ½ DC supply.

12. A method for maintaining a constant resonant transition current from 0° phase angle to 180° phase angle in a full bridge phase displaced resonant transition circuit having switches constructed and operated at duty cycles ranging from 0% to 100%, the method comprising:
   inserting a center tap on a primary winding of the full bridge phase displaced resonant transition circuit with a first end of an inductor connected to the center tapped primary, a second end of the inductor connected to a first end of a capacitor and a second end of the capacitor connected to circuit common;
   operating the full bridge at 100% duty cycle wherein substantially all transformer core losses are at the primary winding and substantially zero voltage is on the inductor; and
   operating the full bridge at 0% duty cycle wherein maximum voltage is on the inductor and substantially zero voltage is on the primary, such that all transformer core losses are at the inductor.

13. The method according to claim 2 further comprising:
   selecting an inductance ratio between the primary winding and the inductor such that each leg of the full bridge maintains a triangle wave of exciting current regardless of phase angle.

14. The method according to claim 12 wherein the full bridge between states of horizontal and diagonal conduction among the switches of the full bridge.

15. The method according to claim 12 wherein when the full bridge is at a substantially no-load condition further comprising the steps of:
   a) switching to a first diagonal conducting state wherein current increases in the primary winding of the full bridge;
   b) switching to a first horizontal conducting state wherein the current in the primary winding ceases to increase and holds its value, and concurrently current in the inductor increases;
   c) switching to a second diagonal conducting state wherein the current in the inductor holds its value until a next horizontal conducting state; and,
   repeating the switching steps a, b and c such that at any given time there is a current in the primary winding or inductor which is increasing and thereby storing energy to be used for resonant transition.

16. The method according to claim 12 further including a step of summing the currents in the primary winding and the inductor to form a triangle waveform.

17. A phase displaced, resonant transition circuit powered by a power supply, the circuit maintaining constant resonant transition current from 0° phase angle to 180° phase angle, the circuit comprising:

a full bridge circuit having at least four semiconductor switches to which control signals are applied;

a transformer having a primary winding connected to the full bridge circuit and a secondary winding inductively coupled to the primary winding;

a controller in operative connection with the full bridge circuit, the controller configured to supply the control signals to the switches; and an inductance capacitance network in operative connection with the primary winding and a circuit common.

18. The resonant transition circuit according to claim 17 wherein the controller is configured to produce a switching sequence for the switches such that at a first switching period in the primary winding acts to store a charge and during a second switching period inductance of the inductance capacitance network acts to store charge.

19. The resonant transition circuit according to claim 17 wherein the inductance capacitance network is in operative connection with the primary winding at a center-tap location.

* * * * *